(12) United States Patent
Ng et al.

(10) Patent No.: US 11,456,775 B2
(45) Date of Patent: Sep. 27, 2022

(54) SLOTTED ELECTRICALLY CONDUCTIVE STRUCTURE FOR IMPROVING INDOOR PENETRATION OF WIRELESS COMMUNICATION SIGNAL

(71) Applicant: ANTwave Intellectual Property Limited, Hong Kong (CN)

(72) Inventors: Kung Bo Ng, Hong Kong (CN); Chun Kai Leung, Hong Kong (CN); Hang Wong, Hong Kong (CN); Chi Sun Yu, Hong Kong (CN)

(73) Assignee: ANTwave Intellectual Property Limited, Hong Kong (CN)

( * ) Notice: Subject to any disclaimer, the term of this patent is extended or adjusted under 35 U.S.C. 154(b) by 280 days.

(21) Appl. No.: 16/748,835

(22) Filed: Jan. 22, 2020

(65) Prior Publication Data

US 2021/0050881 A1 Feb. 18, 2021

Related U.S. Application Data

(60) Provisional application No. 62/885,344, filed on Aug. 12, 2019.

(51) Int. Cl.
*H01Q 13/10* (2006.01)
*H04B 3/52* (2006.01)
(Continued)

(52) U.S. Cl.
CPC ................ *H04B 3/52* (2013.01); *H01P 3/10* (2013.01); *H01P 3/16* (2013.01); *H01Q 1/38* (2013.01); *H01Q 13/24* (2013.01)

(58) Field of Classification Search
CPC .... H01Q 15/0013; H01Q 1/1271; H01Q 1/38; H01Q 1/32; H01Q 15/24; H01Q 1/40;
(Continued)

(56) References Cited

U.S. PATENT DOCUMENTS 5,620,799 A * 4/1997 Sauer ................... H01Q 1/1271
52/173.3
6,356,326 B1 * 3/2002 Tamura ................. G02F 1/1362
349/138

(Continued)

FOREIGN PATENT DOCUMENTS

CN 109843578 A 6/2019

OTHER PUBLICATIONS

International Search Report and Written Opinion of PCT application No. PCT/CN2020/076010 issued from the International Search Authority dated Apr. 9, 2020.

*Primary Examiner* — Linh V Nguyen
(74) *Attorney, Agent, or Firm* — Spruson & Ferguson (Hong Kong) Limited

(57) ABSTRACT

A slotted electrically conductive structure attachable to a substrate and configured to enhance penetration of an incidental radio wave through the substrate is disclosed. The structure allows a substantial portion of the incidental radio wave to penetrate from a first region to a second region through the substrate. The slotted electrically conductive structure comprises a metallic base layer of transparent metal or metal oxide; and one or more patterned slots provided on the metallic base layer. Each of the patterned slots comprises a plurality of feature elements covering an entire area of the patterned slot. The structure reduces thermal energy loss through the substrate and the plurality of feature elements is configured to allow the incidental radio wave to pass through the slotted electrically conductive structure. A multilayer structure comprising the slotted electrically conductive structure and a film structure having randomly distributed irregularly shaped protrusions or pits is also provided.

22 Claims, 13 Drawing Sheets

(51) Int. Cl.
*H01P 3/16* (2006.01)
*H01Q 1/38* (2006.01)
*H01Q 13/24* (2006.01)
*H01P 3/10* (2006.01)

(58) Field of Classification Search
CPC .......... H01Q 1/48; H01Q 17/00; H01Q 19/06; B32B 17/06; B32B 17/10055; B32B 17/1022; B32B 17/10779; B32B 2255/10; B32B 2255/205; B32B 2307/20; B32B 2307/204; B32B 2307/206; B32B 2307/304; B32B 2307/40; B32B 2307/41; B32B 2307/412; B32B 2307/732; B32B 2419/00; B32B 2457/00; B32B 27/06; B32B 27/36; B32B 3/30; B32B 7/12; B32B 15/09; B32B 17/10; B32B 7/02
USPC ................................... 343/767, 702, 700 ms
See application file for complete search history.

(56) References Cited

U.S. PATENT DOCUMENTS

| | | | | |
|---|---|---|---|---|
| 6,860,081 | B2* | 3/2005 | Walton | E06B 7/28 |
| | | | | 52/786.11 |
| 7,019,260 | B1* | 3/2006 | Degand | B32B 17/10761 |
| | | | | 219/203 |
| 8,576,130 | B2* | 11/2013 | Dai | H01Q 13/10 |
| | | | | 343/712 |
| 9,625,685 | B2* | 4/2017 | Ogawa | C03C 17/34 |
| 9,673,534 | B2* | 6/2017 | Dai | H05B 3/0042 |
| 2003/0080909 | A1* | 5/2003 | Voeltzel | B32B 17/10174 |
| | | | | 343/713 |
| 2017/0195054 | A1* | 7/2017 | Ashrafi | H04L 27/38 |
| 2018/0316365 | A1* | 11/2018 | Völkel | H01Q 1/1271 |
| 2020/0048958 | A1* | 2/2020 | Kum | B32B 7/12 |
| 2022/0059948 | A1* | 2/2022 | Sayama | H01Q 1/1271 |

* cited by examiner

SLOTTED ELECTRICALLY CONDUCTIVE STRUCTURE FOR IMPROVING INDOOR PENETRATION OF WIRELESS COMMUNICATION SIGNAL

CROSS-REFERENCE TO RELATED APPLICATIONS

This application claims the benefit of U.S. Provisional Patent Application No. 62/885,344, filed on Aug. 12, 2019, which is incorporated by reference herein in its entirety.

FIELD OF THE INVENTION

The present disclosure generally relates to a slotted electrically conductive structure having feature elements for improving indoor penetration of wireless communication signals, and particularly relates to a transparent or a semi-transparent electrically conductive structure attachable to or embedded within a substrate for transmitting the wireless communication signals, such as the 4G and the 5G signals and future communication technologies, from outdoor to indoor.

BACKGROUND OF THE INVENTION

The fifth-generation (5G) wireless communication system adopts the millimeter wave (mmWave) band to achieve higher network speeds and lower latency than the fourth-generation (4G) wireless communication system or other earlier technologies. The operating frequency of 5G is generally in the range of 24 GHz to 60 GHz or more. It is expected that 5G technology can bring a significant improvement on the wireless data communication with real-time, high-throughput, and low-latency network access, which particularly enables technologies for Internet of Things (IoT) and various unmanned applications, such as autonomous vehicles, control systems for smart cities, high-quality live broadcasting, and remote healthcare.

With the mmWave band, the 5G system is expected to provide very large bandwidth to support applications with extremely high data rates, which may deliver data with speed up to 1 Gbps. However, as the operating frequencies heighten, the 5G signals may suffer serious outdoor to indoor penetration loss. The short wavelengths at those high frequencies mean that mmWave is very susceptible to be blocked or reflected by building walls or even windows. This may not be an issue in 4G or earlier generations. The operating frequency for 4G is generally between 700 MHz and 5.8 GHz, and signals with lower frequencies can pass through a transparent substrate, such as a glass window, of a building.

As an example, FIG. 1 demonstrates the problem of wireless communication, particularly for 5G networks, when delivering data from outdoor to indoor, according to one embodiment known in the art. In the urban area, the outdoor base station system typically has antennas 10 either in the form of towers or placed on building rooftops. Some statistic shows that more than 80% of all mobile data traffic is consumed indoors. Therefore, the outdoor to indoor penetration performance is crucial to the signal coverage of the wireless communication system. When an incidental radio wave 31 is transmitted from the antenna 10 towards a building, some radio waves are reflected by the exterior walls 22 or windows 20, or are lost when penetrating through the windows. In particular, the ordinary glass windows may introduce a smaller penetration loss, but multi-layer glass windows, building windows (such as tinted glass), and partition walls may significantly increase the penetration loss. The problem is the result of the signal impedance mismatch between the air and the glass. Therefore, a reflected radio wave 33 is expected to propagate away from the building. With a wireless communication signal having a frequency above 24 GHz, the reflection loss and the penetration loss would seriously affect the power of the indoor radio wave 32, which may not be as strong as the incidental radio wave 31 after propagation through the walls 22 or windows 20. Therefore, the indoor coverage using mmWave band is not sufficient for meeting an acceptable data communication performance. In some cases, the user may only be able to use 4G or network of earlier generations after entering into a building.

In order to provide better indoor coverage, a distributed antenna system (DAS) may be deployed in the indoor area and building premises for providing internet connectivity. DAS can be driven using a direct connection to the base station or via repeaters. However, DAS may require complex connections between multiple antenna elements and a central hub using fiber optics, which is very expensive and time-consuming to install and upgrade. The infrastructure management and internet service providers may need to make a significant investment for upgrading the equipment and software in order to support the 5G networks.

Accordingly, there is a need in the art for a structure attachable to a substrate that seeks to address at least some of the above problems by improving the indoor penetration of the wireless communication signals. Furthermore, other desirable features and characteristics will become apparent from the subsequent detailed description and the appended claims, taken in conjunction with the accompanying drawings and this background of the disclosure.

SUMMARY OF THE INVENTION

Provided herein is a slotted electrically conductive structure having feature elements for improving indoor penetration of wireless communication signals.

According to certain aspects, the slotted electrically conductive structure attachable to a substrate having a first dielectric constant and configured to enhance penetration of an incidental radio wave with a wavelength $\lambda$ through the substrate by allowing a substantial portion of the incidental radio wave to penetrate from a first region having a second dielectric constant to a second region through the substrate. The slotted electrically conductive structure comprising a metallic base layer of transparent metal or metal oxide; and one or more patterned slots provided on the metallic base layer, wherein each of the patterned slots comprises a plurality of feature elements covering an entire area of the patterned slot, thereby the slotted electrically conductive structure reduces thermal energy loss through the substrate and the plurality of feature elements is configured to allow the incidental radio wave to pass through the slotted electrically conductive structure.

In another embodiment of the present disclosure, each of the plurality of feature elements has a feature length less than $n\lambda/2$ and a feature width less than $n\lambda/2$, wherein $n=0.5$, 1, 1.5, . . . etc, such that the incidental radio wave can pass through the slotted electrically conductive structure. The plurality of feature elements are arranged in rows and columns repeatedly across the patterned slot, and wherein each of the feature elements has a pattern symmetrically arranged in both vertical and horizontal directions.

In one embodiment, the plurality of feature elements are formed by a combination of a transparent metallic coating and transparent non-metallic lines. In another embodiment, the plurality of feature elements are formed by a combination of a transparent non-metallic coating and transparent metallic lines.

In yet another embodiment of the present disclosure, the slotted electrically conductive structure has two or more patterned slots, each of the two or more patterned slots has different feature elements, thereby each of the two or more patterned slots is configured to transmit a particular frequency range of radio waves through the substrate, and the slotted electrically conductive structure allows the incidental radio wave of a wide range of frequencies to penetrate.

In another embodiment of the present disclosure, a multilayer structure has a stack of two structures arranged in any order attachable to a first surface of the substrate. The two structures comprising the slotted electrically conductive structure and a film structure for converging the incidental radio wave to a focal point or a focal area in the second region. The film structure comprises a bottom layer of transparent material; and a plurality of irregularly shaped protrusions distributing randomly across the film structure and protruding from the bottom layer. Each of the irregularly shaped protrusions has a height less than $2\lambda$ and a width less than $2\lambda$. The substrate, after attaching the film structure thereon, has a third dielectric constant and is configured to converge the incidental radio wave to a focal point in the second region. The third dielectric constant has a value closer to the second dielectric constant.

In one further embodiment, any two adjacent protrusions are separated by a distance in a range between $0.2\lambda$ and $2\lambda$.

In another embodiment of the present disclosure, a multilayer structure having a stack of two structures arranged in any order attachable to a first surface of the substrate. The two structures comprising the slotted electrically conductive structure and a film structure for converging the incidental radio wave to a focal point or a focal area in the second region. The film structure comprises a bottom layer of transparent material; and a plurality of irregularly shaped pits distributing randomly across the film structure and engraved from the bottom layer. Each of the irregularly shaped pits has a depth less than $2\lambda$ and a width less than $2\lambda$. The substrate, after attaching the film structure thereon, has a third dielectric constant and is configured to converge the incidental radio wave to a focal point in the second region. The third dielectric constant has a value closer to the second dielectric constant.

In one further embodiment, any two adjacent pits are separated by a distance in a range between $0.2\lambda$ and $2\lambda$.

In one further embodiment, the bottom layer is a fully transparent material selected from a group consisting transparent plastic, glass, Sapphire ($Al_2O_3$) and Acrylic.

In one further embodiment, the multilayer structure comprises a second film structure attachable to a second surface of the substrate. The film structure is configured to converge the incidental radio wave to the focal point or the focal area on the second film structure. The second film structure is configured to diverge the incidental radio wave to a plane wave. In certain embodiments, the substrate is a double layer glass.

In one further embodiment, the incidental radio wave is a wireless radio wave operating with 5G technologies.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects and advantages of the present invention are disclosed as illustrated by the embodiments hereinafter.

BRIEF DESCRIPTION OF THE DRAWINGS

The appended drawings contain figures to further illustrate and clarify the above and other aspects, advantages, and features of the present disclosure. It will be appreciated that these drawings depict only certain embodiments of the present disclosure and are not intended to limit its scope. It will also be appreciated that these drawings are illustrated for simplicity and clarity and have not necessarily been depicted to scale. The present disclosure will now be described and explained with additional specificity and detail through the use of the accompanying drawings in which.

Figure 1:
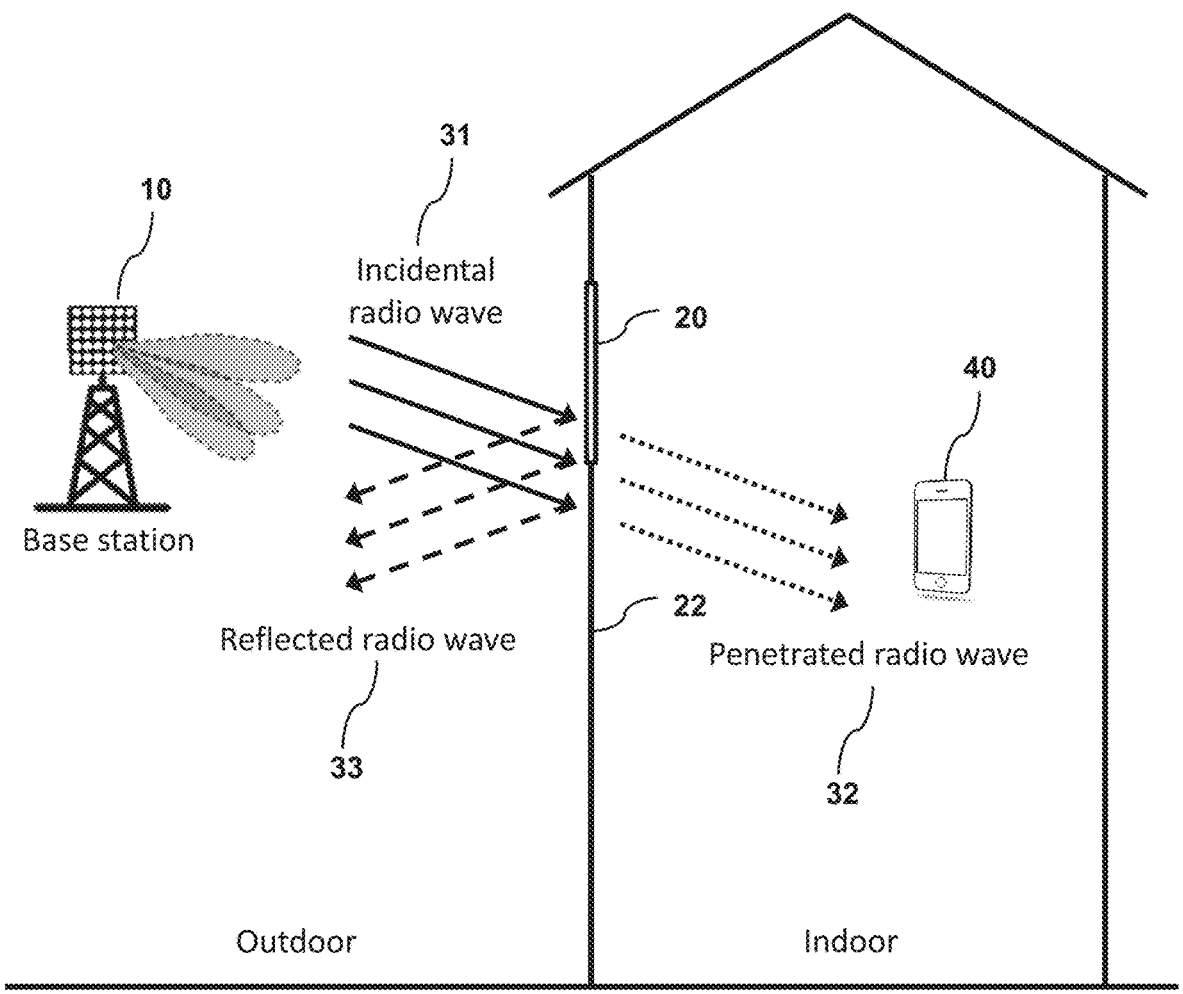
FIG. 1 is a conceptual diagram depicting the propagation of the wireless communication signal from outdoor to indoor, particularly for 5G signal.

Skilled artisans will appreciate that elements in the figures are illustrated for simplicity and clarity and have not necessarily been depicted to scale.

DETAILED DESCRIPTION OF THE INVENTION

The following detailed description is merely exemplary in nature and is not intended to limit the disclosure or its application and/or uses. It should be appreciated that a vast number of variations exist. The detailed description will enable those of ordinary skilled in the art to implement an exemplary embodiment of the present disclosure without undue experimentation, and it is understood that various changes or modifications may be made in the function and structure described in the exemplary embodiment without departing from the scope of the present disclosure as set forth in the appended claims.

The present disclosure generally relates to a slotted electrically conductive structure having feature elements for improving indoor penetration of wireless communication signals. More specifically, but without limitation, the present disclosure relates to a transparent or semi-transparent electrically conductive structure attachable to or embedded within a substrate for transmitting the wireless communication signals, such as the 4G and the 5G signals, from outdoor to indoor.

As used herein, the term "dielectric constant ($\varepsilon_r$)" is used to refer to the ratio of the permittivity of a substance to the permittivity of free space. It is an expression of the extent to which a material concentrates electric flux and is the electrical equivalent of relative magnetic permeability. When the dielectric constant increases while all other factors remain constant, the electric flux density increases. This enables objects of a given size, such as sets of metal plates, to hold their electric charge for long periods of time, and/or to hold large quantities of charge.

The term "region" is used to denote an area or a space distinguishable from other regions, which may be separated from another region by boundaries, layers of material or a substrate.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to illuminate the invention better and does not pose a limitation on the scope of the invention unless the claims expressly state otherwise. Recitation of ranges of values herein are merely intended to serve as a shorthand method of referring individually to each separate value falling within the range, unless otherwise indicated herein, and each separate value is incorporated into the specification as if it were individually recited herein. Furthermore, as used herein, the term "about" or "approximately", when used in conjunction with a numerical value or range of values, refers preferably to a range that is within 10 percent, preferably within 5 percent, or more preferably within 1 percent of the value with which the term is associated. No language in the specification should be construed as indicating any non-claimed element as essential to the practice of the invention. The term "substantial" as used herein, means at least about 50%, preferably at least 60%, and more preferably at least 80%.

Film Structure for Enhancing Substrate Penetration

Figure 2:
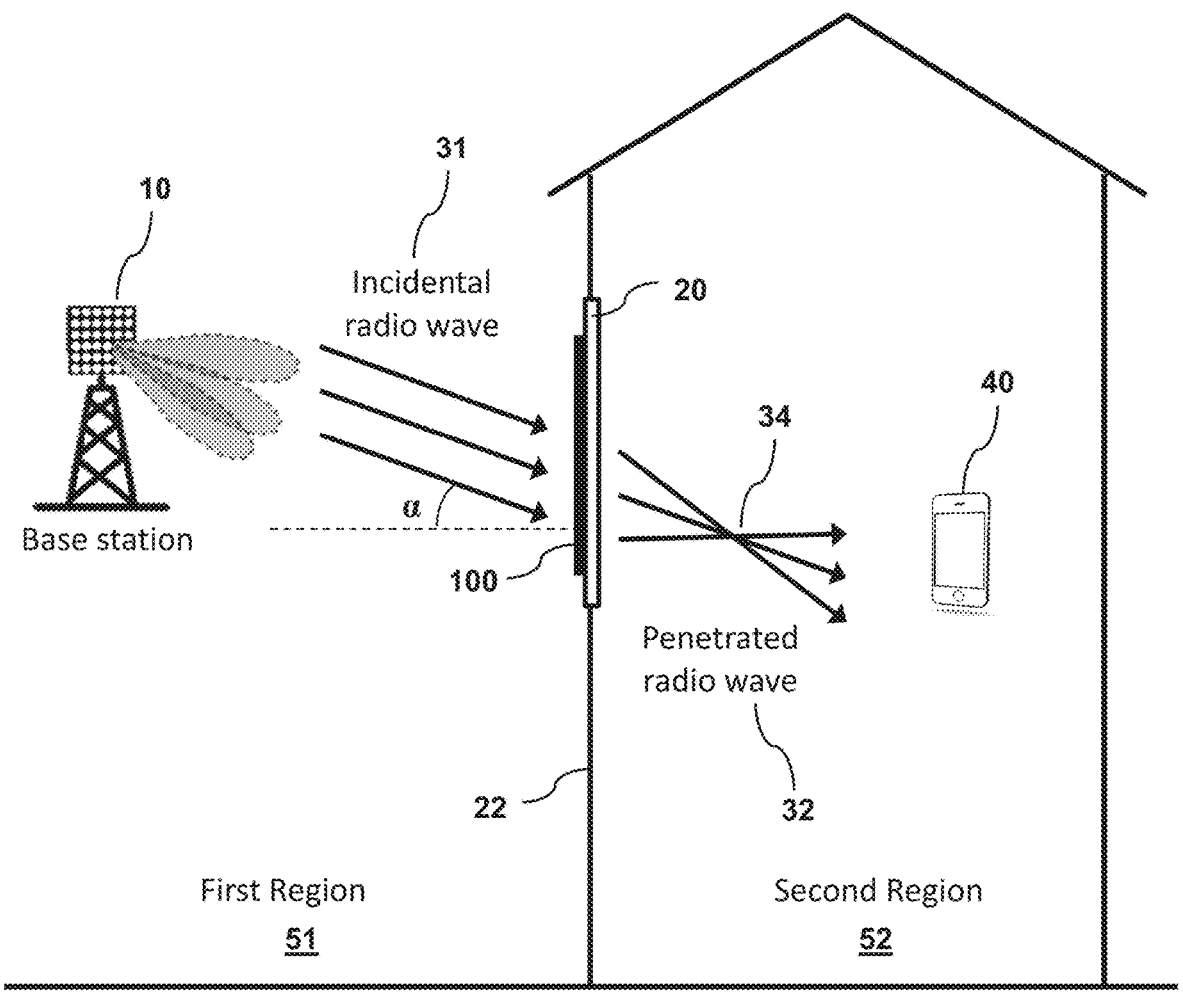
FIG. 2 is a conceptual diagram depicting the propagation of the wireless communication signal through a glass with a film structure attached in accordance with certain embodiments of the present disclosure.

FIG. 2 depicts the propagation of the wireless communication signal from an outdoor base station (BS) 10 to a user equipment 40 at an indoor position through a substrate 20 in accordance with one embodiment of the present disclosure. The BS 10 comprises antenna equipment that can be configured to transmit or receive signals for multiple users. The signal can be a wireless radio wave operating with 5G, 4G, 3G, or other technologies in succession of the 5G technology (such as 6G) using higher frequencies than 5G. The spirit of the present disclosure may also be utilized in other wireless communication systems, which includes but be not limited to Bluetooth, Wi-Fi communications, near field communication (NFC), radio-frequency identification (RFID), satellite communications, etc. The user equipment 40 may be a cellular phone, a wearable device, a tablet, a computer, or other electronic devices capable of transmitting and receiving wireless radio wave signals. The user equipment 40 generally comprises processors or electronic circuitries including but not limited to digital signal processors (DSP), application-specific integrated circuits (ASIC), field programmable gate arrays (FPGA), and other programmable logic devices. The substrate 20 may be a transparent glass or window installed on the wall 22 of a building.

The BS 10 is generally in the form of a tower or placed on a building rooftop in a first region 51. The first region 51 may be an outdoor environment. The user equipment 40, positioned in a second region 52, attempts to communicate with the BS 10. The second region 52 may be an indoor environment or an area physically separated from the first region 51 by a boundary, a structure or a wall. Wireless communication signals using lower frequencies, such as 3G and 4G technologies, can generally pass through the substrate 20 of a building and reach the second region 52 with negligible loss in signal strength. Therefore, a user can still effectively perform data and voice communication using the 3G and 4G technologies in an indoor environment.

However, as the operating frequencies heighten to 24 GHz to 60 GHz in the 5G technology, the ability in penetrating material decreases and the signals may suffer serious outdoor to indoor penetration loss. As previously shown in FIG. 1, the incidental radio wave 31 may partially be reflected by the exterior wall 22 and partially be lost when penetrating through the wall 22 or the substrate 20. The penetrated radio wave 32 received or transmitted by the user equipment 40 in an indoor environment is expected to be a weaker signal, which may result in missing the expected performance in speed and latency of the 5G signals.

An aspect of the present disclosure is to provide a film structure 100 attachable to a substrate 20 and configured to enhance penetration of the incidental radio wave 31 through the substrate 20 by allowing at least a substantial portion of the incidental radio wave 31 to penetrate from a first region 51 to a second region 52. The film structure 100 is a wave reformation film and comprises an adhesive surface on at least one side of the film structure 100 that may be utilized to attach to another surface. The substrate 20, after attaching the film structure 100 thereon, is configured to converge the incidental radio wave 31 to a focal point or a focal area 34 in the second region 52. The film structure 100 may completely or partially cover the substrate 20, such that at least an area of substrate 20 has the film structure 100 attached thereon. The size of the film structure 100 depends on the gain and the characteristics of the incidental radio wave 31. As depicted in FIG. 2, the film structure 100 is adhesively attached to the exterior side of the substrate 20 in the first region 51. In certain embodiments, the film structure 100 may also be adhesively attached to the interior side of the substrate 20 in the second region 52.

The problem of the penetration loss when transmitting an incidental radio wave 31 through a substrate 20 is related to the wave impedance mismatch. The air has a dielectric constant of 1, and a wave impedance of $Z_1$. Comparing with the substrate 20, for example, a low-E glass, the dielectric constant may be in a range between 5 to 7 or higher with different wave impedance $Z_2$. As it is known that the wave impedance is given by the ratio of the electric field to the magnetic field (E/H). This reflection of wave depends on the impedance mismatch of the radio wave traveling in air relative to the substrate 20. The purpose of the present disclosure is to reduce the dielectric constant of the substrate 20 from radio wave point of view to a range closer to air, for example between 3 to 4, by adhesively attaching a uniquely designed film structure 100 thereon, such that the wave impedance can be changed to $Z_3$ and approximately matches with the impedance of air. As a result, the reflected radio wave 33 signal strength can be minimized to at least 10% of the signal strength of the incidental radio wave 31. Therefore, the substrate 20 has a first dielectric constant, which is significantly larger than the second dielectric constant of the air in the first region 51. By adhesively attaching a film structure 100 to the substrate 20, the film together with the substrate 20 has a third dielectric constant, which has a value closer to the second dielectric constant from radio wave point of view. The wave impedance of the air and the substrate 20 can approximately be matched to minimize the wave reflection at the boundary between the air and the substrate 20. The user equipment 40 in the second region 52 can effectively communicate with the BS 10 as the penetrated radio wave 32 is a stronger signal. This effect is more obvious if the incidental radio wave 31 comes from an angle α greater than 0 degree.

Figure 3:
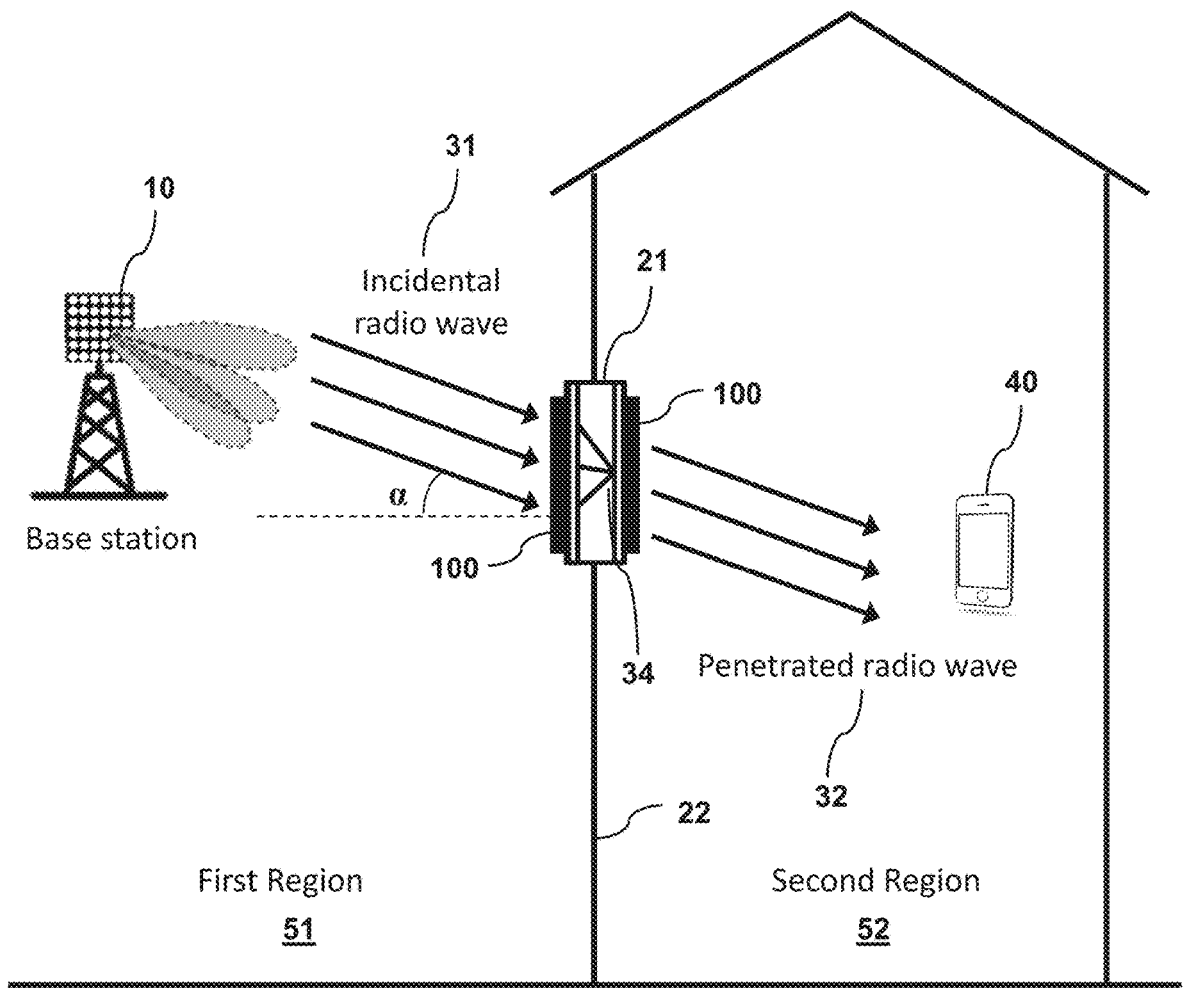
FIG. 3 is a conceptual diagram depicting the propagation of the wireless communication signal through a double layer glass with two film structures attached in accordance with certain embodiments of the present disclosure.

FIG. 3 depicts the propagation of the wireless communication signal from an outdoor BS 10 to a user equipment 40 at an indoor position through a double layer glass 21 in accordance with one embodiment of the present disclosure. A double layer glass 21 is characterized by different properties than a single layer of glass, and the extra layer of glass increases the impact of the radio wave reflection and penetration loss. Therefore, the penetrated radio wave 32 is much weaker than the incidental radio wave 31 transmitting from the BS 10.

In order to enhance penetration of the incidental radio wave 31 from a first region 51 to a second region 52 through the double layer glass 21, two film structures 100 are respectively adhesively attached to the exterior glass layer and the interior glass layer of the double layer glass 21. The exterior glass layer, after attaching a film structure 100 thereon, is configured to converge the incidental radio wave 31 to a focal point or a focal area 34 on the interior glass layer. The interior glass layer, also after attaching a film structure 100 thereon, is configured to diverge the focused radio wave to a penetrated radio wave 32 in the form of a plane wave in the second region 52. The dielectric constant of each layer of glass from radio wave point of view is reduced to a range closer to air, for example between 3 to 4, such that the wave impedance can be changed to $Z_3$ and approximately matches with the impedance of air. Therefore, the user equipment 40 in the second region 52 can effectively communicate with the BS 10 as the penetrated radio wave 32 is a stronger signal.

Figure 4:
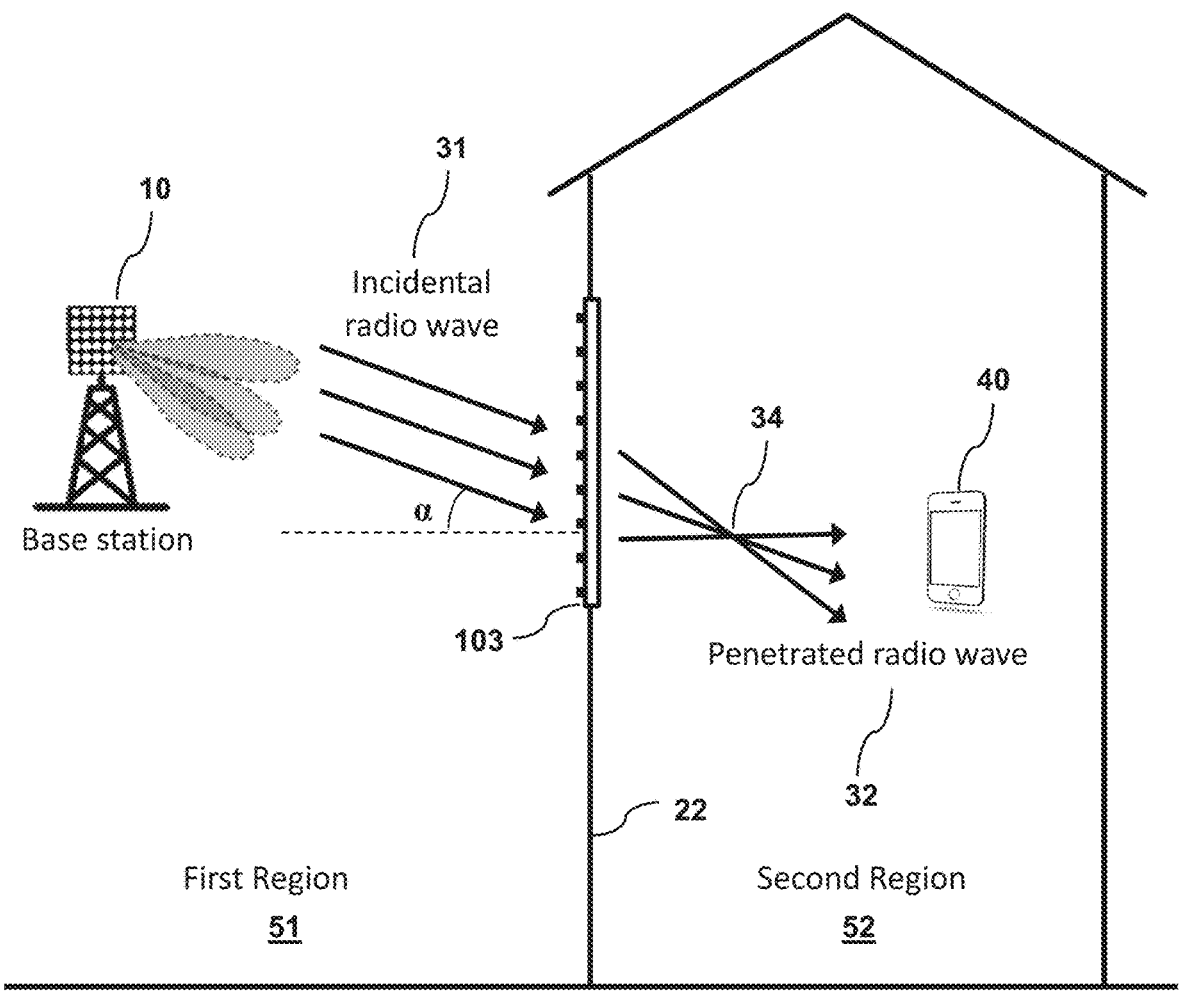
FIG. 4 is a conceptual diagram depicting the propagation of the wireless communication signal through a surface-enhanced substrate in accordance with certain embodiments of the present disclosure.

FIG. 4 depicts the propagation of the wireless communication signal from an outdoor BS 10 to a user equipment 40 at an indoor position through a surface-enhanced substrate 103 in accordance with one embodiment of the present disclosure. When installing a new window, a surface-enhanced substrate 103 can be used as the glass window. The surface-enhanced substrate 103 is configured to enhance penetration of the incidental radio wave 31 through the surface-enhanced substrate 103 by allowing at least a substantial portion of the incidental radio wave 31 to penetrate from a first region 51 to a second region 52. In particular, the surface-enhanced substrate 103 is configured to converge the incidental radio wave 31 to a focal point or a focal area 34 in the second region 52. This effect is more obvious if the incidental radio wave 31 comes from an angle α greater than 0 degree.

The surface-enhanced substrate 103 has a dielectric constant from radio wave point of view in a range closer to air, for example between 3 to 4, which is smaller than the dielectric constant of an ordinary glass. The wave impedance can be changed to $Z_3$ and approximately matches with the impedance of air. Therefore, the user equipment 40 in the second region 52 can effectively communicate with the BS 10 as the penetrated radio wave 32 is a stronger signal.

Figure 5A:
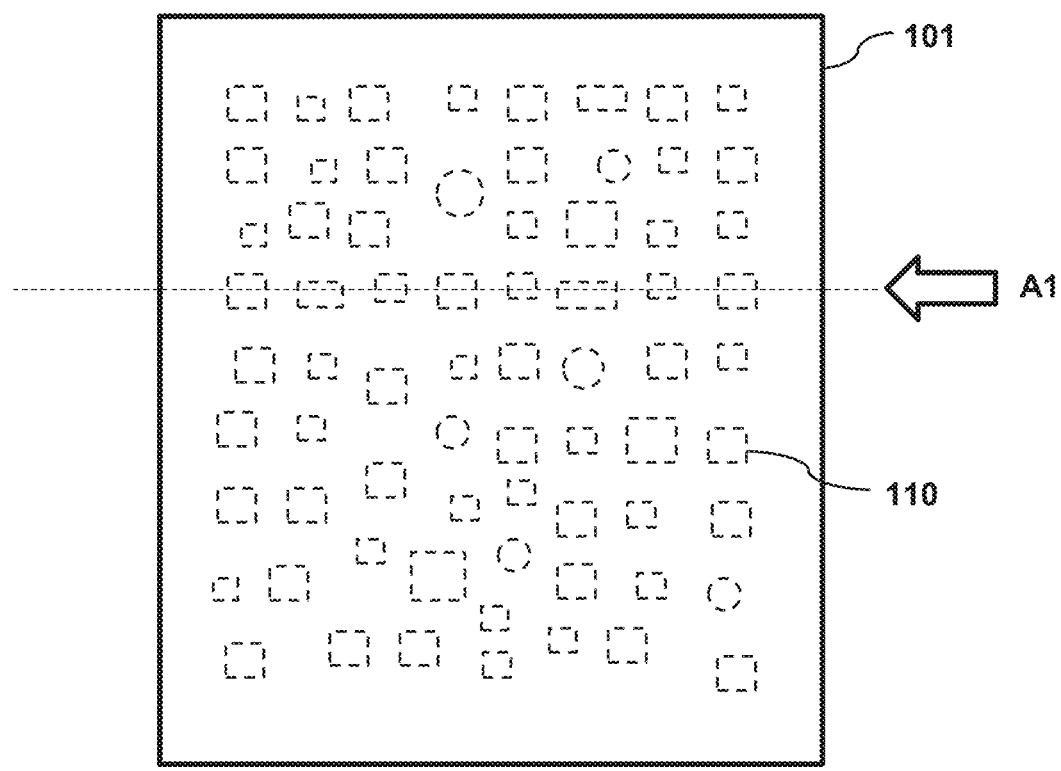
FIG. 5A is a top view of a film structure having a plurality of pits in accordance with certain embodiments of the present disclosure.
Figure 5B:
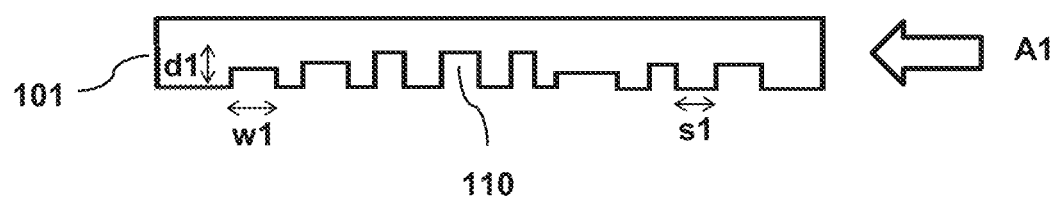
FIG. 5B is a cross-sectional side view of a film structure of FIG. 5A in accordance with certain embodiments of the present disclosure.

An exemplary film structure 100 is detailed as follows with an aid of the top view in FIG. 5A and the cross-sectional side view (as viewed from A1) in FIG. 5B. The film structure 100 comprises a bottom layer 101 and a plurality of irregularly shaped pits 110. The bottom layer 101 can be a fully transparent material, such as transparent plastic, glass, Sapphire ($Al_2O_3$), Acrylic, etc, or other semi-transparent materials. The pits 110 are distributed randomly across the film structure 100 and are engraved from the bottom layer 101. The film structure 100 can be attached to a substrate 20 such that the substrate 20 is provided with a plurality of pits 110.

The pit 110 is sized based on the wavelength (λ) of the incidental radio wave 31 and the dielectric constant of the substrate 20 (i.e. in a range between 5 and 12). In certain embodiments, each of the irregularly shaped pits 110 has a maximum depth d1 of 2λ and a maximum width w1 of 2λ. In one further embodiment, the depth d1 is in a range between 0.2λ and 2λ, and the width w1 is in a range between 0.2λ and 2λ. For example, if the incidental signal 31 has an operating frequency of 28 GHz (wavelength is 10.7 mm) and the substrate 20 has a dielectric constant of 1, the maximum depth d1 and the maximum width w1 of each pit 110 is 21.4 mm. In another example, when the operating frequency of the incidental signal 31 is 48 GHz (wavelength is 6.2 mm) and the substrate 20 has a dielectric constant of 1, the maximum depth d1 and the maximum width w1 of each pit 110 is 12.4 mm.

The separation s1 between two adjacent pits 110 is also inversely proportional to the operating frequency and the dielectric constant of the substrate 20. In certain embodiments, the maximum separation s1 is less than $2\lambda$, and more preferably the separation s1 is in a range between $0.2\lambda$ and $2\lambda$.

Figure 6A:
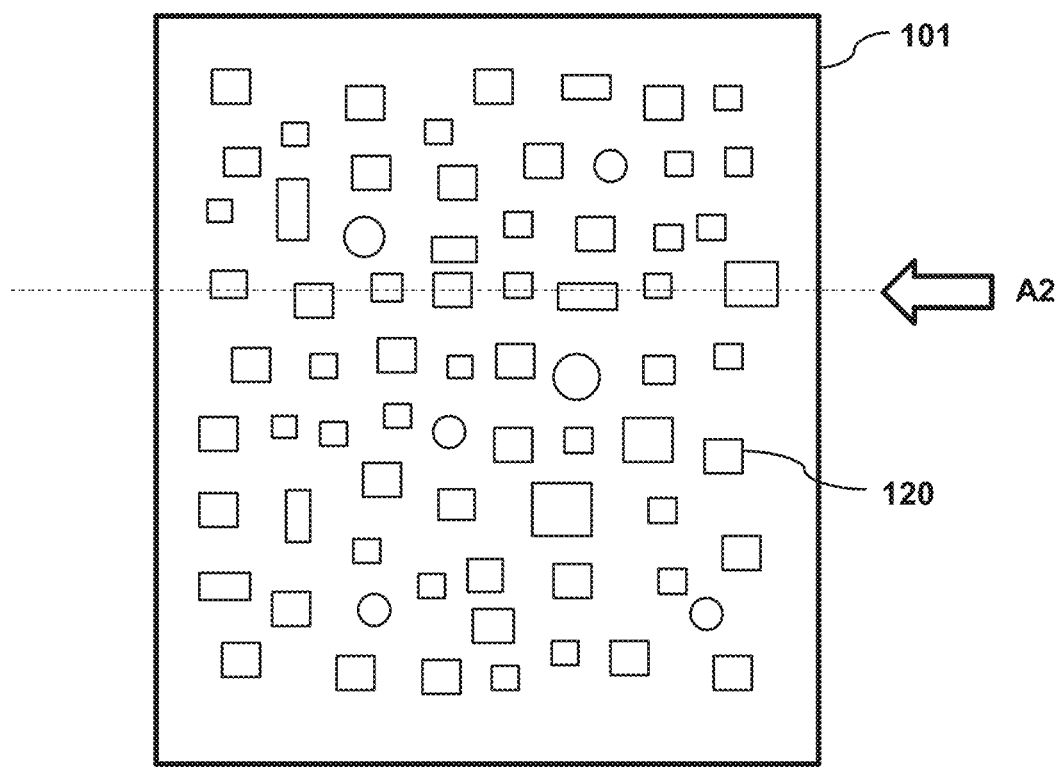
FIG. 6A is a top view of a film structure having a plurality of protrusions in accordance with certain embodiments of the present disclosure.
Figure 6B:
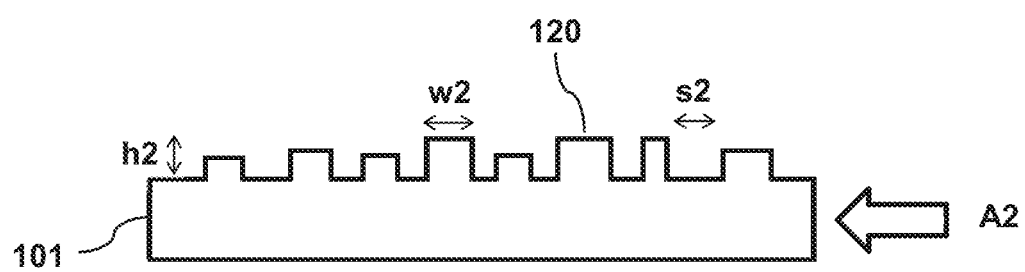
FIG. 6B is a cross-sectional side view of a film structure of FIG. 6A in accordance with certain embodiments of the present disclosure.

Another exemplary film structure 100 is detailed as follows with an aid of the top view in FIG. 6A and the cross-sectional side view (as viewed from A2) in FIG. 6B. The film structure 100 comprises a bottom layer 101 and a plurality of irregularly shaped protrusions 120. The protrusions 120 are distributed randomly across the film structure 100 and are protruding from the bottom layer 101. The film structure 100 can be attached to a substrate 20 such that the substrate 20 is with a plurality of irregularly shaped protrusions 120.

The protrusion 120 is sized based on the wavelength ($\lambda$) of the incidental radio wave 31 and the dielectric constant of the substrate 20 (i.e. in a range between 5 and 12). In certain embodiments, each of the irregularly shaped protrusions 120 has a maximum height h2 of $2\lambda$ and a maximum width w2 of $2\lambda$. In one further embodiment, the height h2 is in a range between $0.2\lambda$ and $2\lambda$, and the width w2 is in a range between $0.2\lambda$ and $2\lambda$. For example, if the incidental signal 31 has an operating frequency of 28 GHz (wavelength is 10.7 mm) and the substrate 20 has a dielectric constant of 1, the maximum height h2 and the maximum width w2 of each protrusions 120 is 21.4 mm. In another example, when the operating frequency of the incidental signal 31 is 48 GHz (wavelength is 6.2 mm) and the substrate 20 has a dielectric constant of 1, the maximum height h2 and the maximum width w2 of each protrusions 120 is 12.4 mm.

The separation s2 between two adjacent protrusions 120 is also inversely proportional to the operating frequency and the dielectric constant of the substrate 20. In certain embodiments, the maximum separation s2 is less than $2\lambda$, and more preferably the separation s2 is in a range between $0.2\lambda$ and $2\lambda$.

The surface-enhanced substrate 103 has built-in structures for enhancing penetration of the incidental radio wave 31. The built-in structure may be similar to the plurality of irregularly shaped pits 110 in FIG. 5A or the plurality of irregularly shaped protrusions 120 in FIG. 6A. The pits 110 or the protrusions 120 in the surface-enhanced substrate 103 may exhibit the same physical characteristics and limitations as the pits 110 or the protrusions 120 in the film structure 100 respectively.

Metallic Coating for Reducing Thermal Energy Loss

In commercial buildings, hotels, and large infrastructures, a higher window-to-wall ratio is generally observed with more use of glass to replace walls. The window area significantly affects energy performance in a building and has impacts on heating, cooling, ventilation, and interior lighting. Therefore, windows of a building have a notable influence on the overall energy consumption. The types of glass and heat preserving coating have been important aspects of consideration for balancing the extensive use of glass and energy efficiency.

Low-emissivity (Low-E) glass windows or low-E coatings are widely used to minimize the amount of infrared and ultraviolet light that comes through the window, without minimizing the amount of light that passes through the windows. There are two basic processes for making low-E coatings, namely sputtering and pyrolytic process.

Sputtered coatings (soft-coat) typically comprise metals, metal oxides, and/or metal nitrides. The coating process and the manufacture of the glass are done independently. The metallic coating is deposited onto the surface of the glass in a vacuum chamber, under a process called physical vapor deposition. Sputtered coatings may also comprise one or more layers of silver to achieve the heat reflecting properties.

Pyrolytic low-E coatings (hard-coat) are generally non-reflective and highly transparent coatings using metallic oxide. The most common type of metallic oxide used is tin oxide. The metallic oxide is bonded to the glass while the glass is still in a semi-molten state. Therefore, the coating can become a permanent part of the glass, rather than a layer on top of the glass surface, with increased durability and toughness.

Since the low-E glass has at least a layer of metallic coating for reflecting energy in order to reduce thermal energy loss, the low-E glass has also suffered from an inevitable problem of signal blockage and reflection. The radio waves from outside are prevented from getting into the buildings by the low-E glass. The present disclosure further provides a slotted electrically conductive structure 200 that is attached to or bonded to the substrate 20 (hard-coat or soft-coat) for reducing thermal energy loss and improving the communication signal reduction problem.

Slotted Electrically Conductive Structure

Figure 7A:
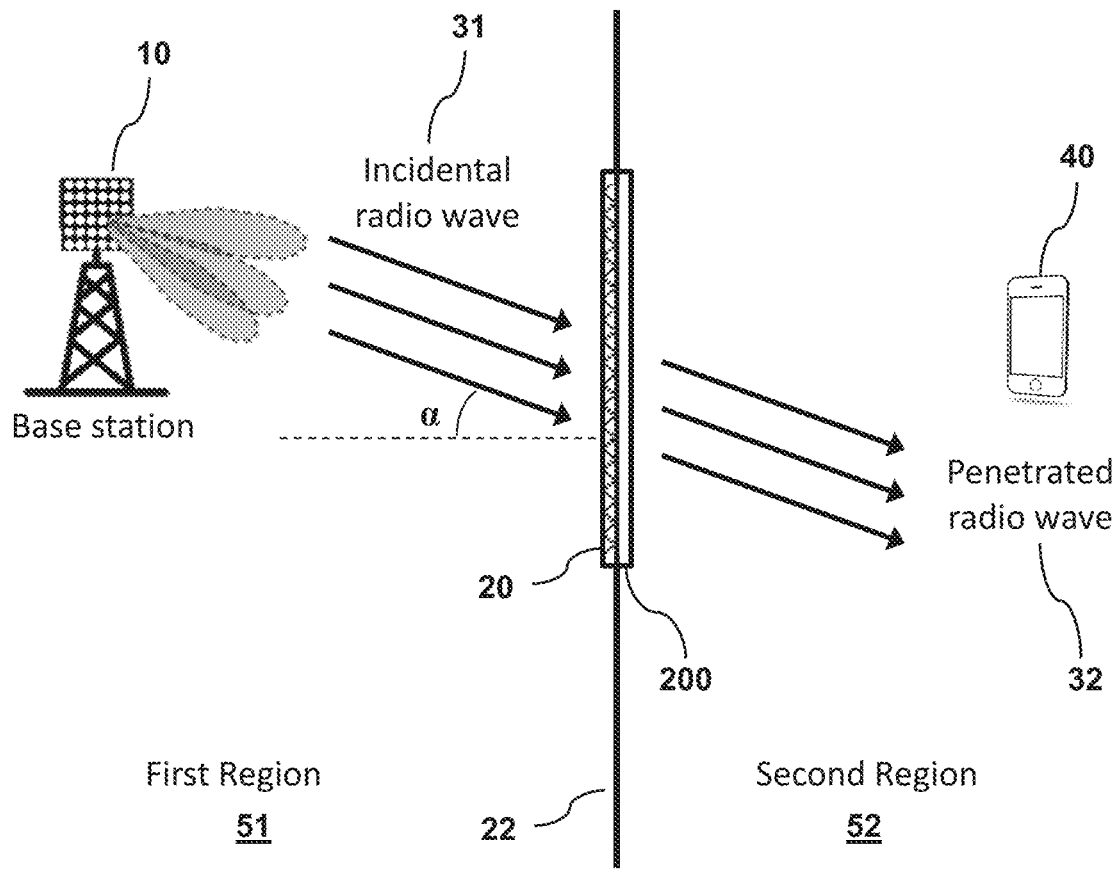
FIG. 7A is a conceptual diagram depicting the propagation of the wireless communication signal through a substrate with a slotted electrically conductive structure in accordance with certain embodiments of the present disclosure.
Figure 7B:
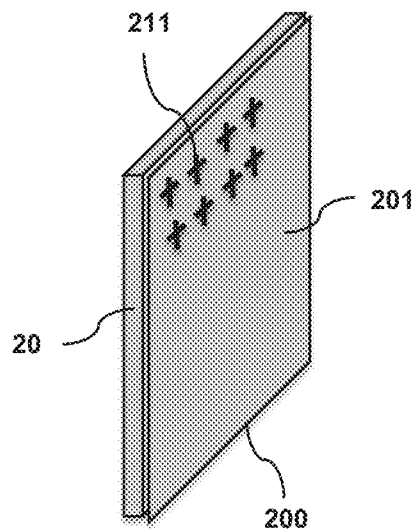
FIG. 7B is a perspective view of a slotted electrically conductive structure attached to a substrate in accordance with certain embodiments of the present disclosure.

As shown in FIG. 7A, a slotted electrically conductive structure 200 is attached or bonded to the substrate 20 having a first dielectric constant and configured to enhance penetration of an incidental radio wave 31 with a wavelength $\lambda$ through the substrate 20. A substantial portion of the incidental radio wave 31 is allowed to penetrate from the first region 51 having a second dielectric constant to the second region 52 through the substrate 20. The slotted electrically conductive structure 200 may partially cover or fully cover the substrate 20. The substrate 20 and the slotted electrically conductive structure 200, which may be transparent or semi-transparent, collectively configured to reduce thermal energy loss through the substrate 20 and to allow the incidental radio wave 31 signal to pass through with less reflection. As shown in FIG. 7B, the slotted electrically conductive structure 200 comprises a metallic base layer 201 made of transparent metal, metal oxide, or other electrically conductive element and a plurality of feature elements 211 in the one or more patterned slots 210, as demonstrated in FIGS. 8A-8D. The metallic base layer 201 has a structure similar to the metallic coating of the low-E glass, which can reduce thermal energy loss. However, the problem of signal blockage and reflection is expected for the metallic base layer 201 that is not covered by the feature elements 211. The one or more patterned slots 210 having the plurality of feature elements 211 covering an entire area of the patterned slot 210 is configured to reduce thermal energy loss through the substrate 20 and allowing the incidental radio wave 31 to pass through the slotted electrically conductive structure 200. The method is called "radio wave signal impedance matching". In certain embodiments, the slotted electrically conductive structure 200 may further comprise an adhesive layer so that the slotted electrically conductive structure 200 can be attached to a substrate 20 including a normal glass window (e.g.: tinted glass) to achieve the same performance. This effect is more obvious if the incidental radio wave 31 comes from an angle α greater than 0 degree.

The feature element 211 may be formed by a combination of a transparent metallic coating and transparent non-metallic lines. In other embodiments, the feature element 211 may be formed by a combination of a transparent non-metallic coating and transparent metallic lines. The shape, the size, and the number of the feature elements 211 are not limited to that shown in the figures and may vary depending on the operation frequency, antenna gain, and beam formation requirements. In particular, the number of feature elements 211 and the total area having the feature elements 211 are determined in accordance with the energy of the wireless communication signals passing through the substrate 20. In certain embodiments, the plurality of feature elements 211 may be arranged in rows and columns repeatedly across the patterned slot 210.

Figure 8A:
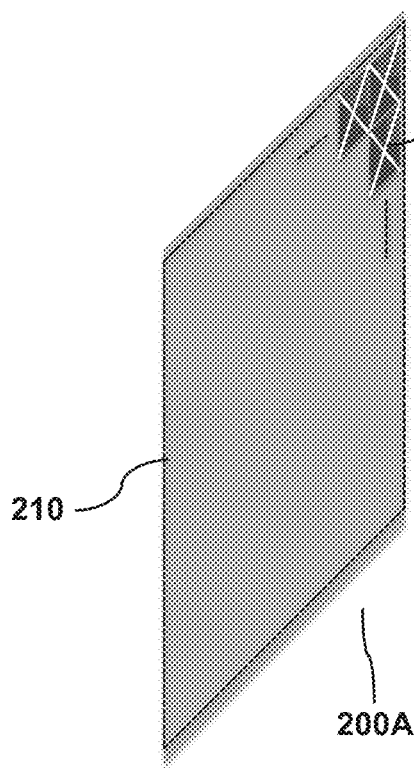
FIG. 8A is a perspective view of a slotted electrically conductive structure fully covered by a pattern slot in accordance with certain embodiments of the present disclosure.

FIG. 8A shows a first slotted electrically conductive structure 200A fully covered by a pattern slot 210, which is an area that can reduce thermal energy loss without a significant impact on the signal penetration performance.

Figure 8B:
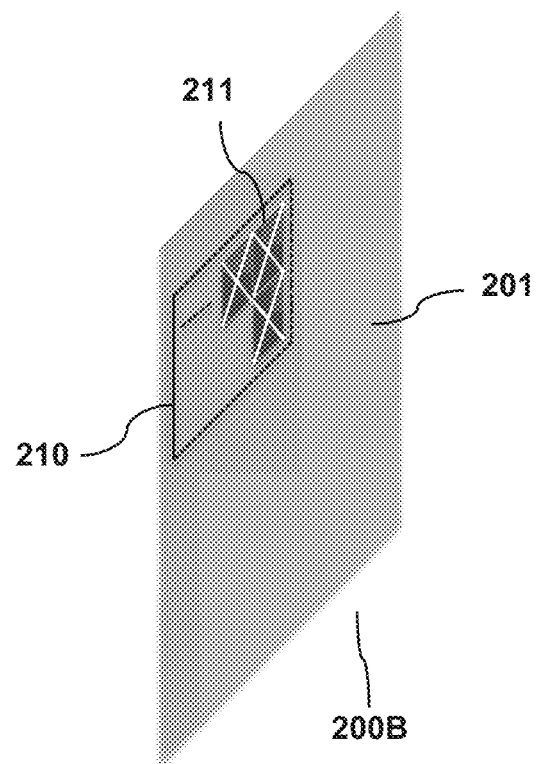
FIG. 8B is a perspective view of a slotted electrically conductive structure partially covered by a pattern slot in accordance with certain embodiments of the present disclosure.

FIG. 8B shows a second slotted electrically conductive structure 200B partially covered by a pattern slot 210. The pattern slot 210 has a smaller area and only covers part of the substrate 20. The metallic base layer 201 is made of transparent metal or metal oxide having a structure similar to the metallic coating of the low-E glass, which can reduce thermal energy loss, but with the problem of signal blockage and reflection.

Figure 8C:
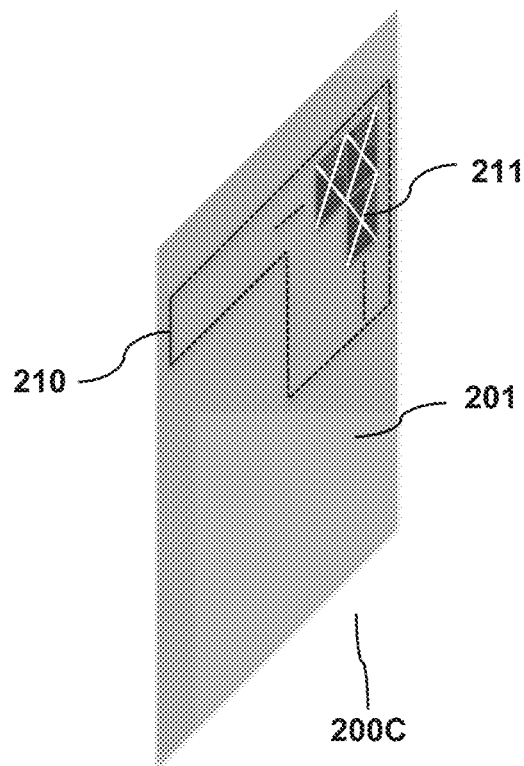
FIG. 8C is a perspective view of a slotted electrically conductive structure partially covered by a pattern slot of an irregular shape in accordance with certain embodiments of the present disclosure.

FIG. 8C shows a third slotted electrically conductive structure 200C partially covered by a pattern slot 210 of an irregular shape placed on the metallic base layer 201.

Figure 8D:
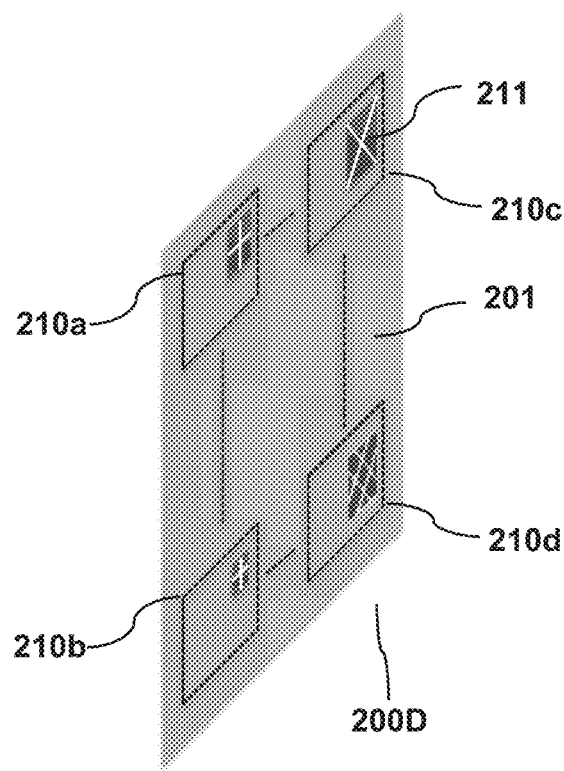
FIG. 8D is a perspective view of a slotted electrically conductive structure partially covered by a plurality of patterned slots in accordance with certain embodiments of the present disclosure.

FIG. 8D shows a fourth slotted electrically conductive structure 200D partially covered by a plurality of patterned slots 210a-210d. The plurality of patterned slots 210a-210d may each has different feature elements 211 and/or different dimensions. Therefore, each of the plurality of patterned slots 210a-210d may be configured to transmit a particular frequency range of radio waves through the substrate 20 such that the fourth slotted electrically conductive structure 200D can reduce thermal energy loss without significant impact on the penetration performance of signals of a wider range of frequencies. The plurality of patterned slots 210a-210d may not fully cover the entire area of the fourth slotted electrically conductive structure 200D, and the uncovered area is the metallic base layer 201.

Figure 9:
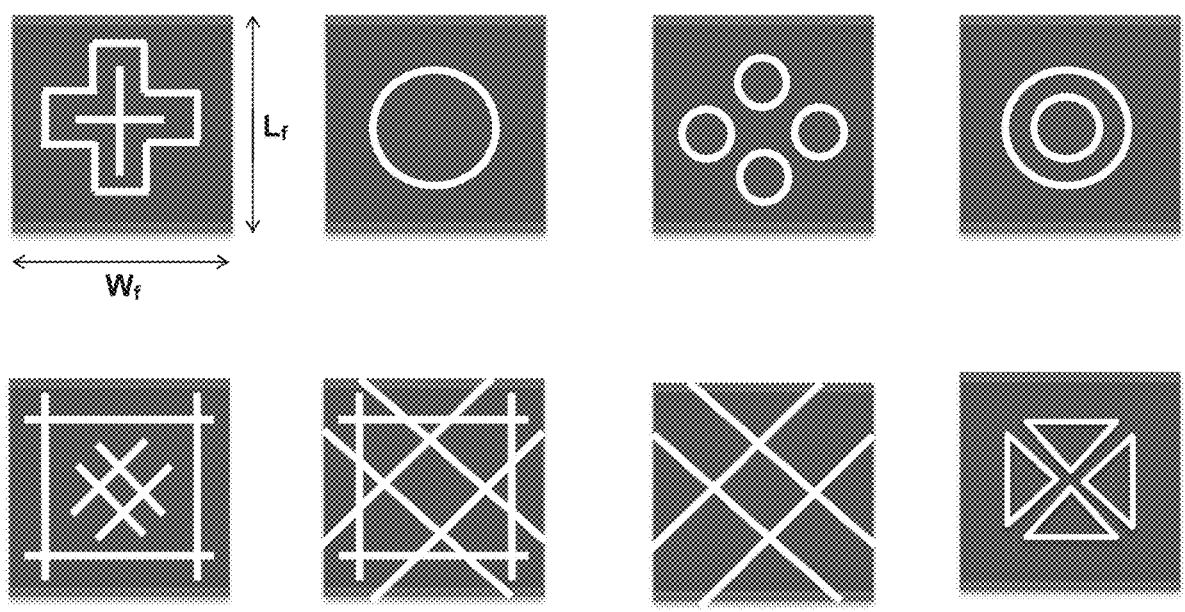
FIG. 9 shows eight examples of feature elements in a patterned slot in accordance with certain embodiments of the present disclosure.

Referring to FIG. 9, eight examples of feature elements 211 for the use in a patterned slot 210 are illustrated. Each of the feature elements 211 has a feature length ($L_f$) less than $n\lambda/2$ and a feature width ($W_f$) less than $n\lambda/2$, wherein n=0.5, 1, 1.5, . . . etc, such that the incidental radio wave 31 can pass through the slotted electrically conductive structure 200. The design of the feature elements, as shown in FIG. 9 are generated by computer algorithms written to iteratively optimize the penetration performance yielding the minimum signal loss. Therefore, it is apparent that the design of the feature elements 211 is not limited to these eight examples. In certain embodiments, the feature elements 211 may have a pattern symmetrically arranged in both vertical and horizontal directions.

Figure 10:
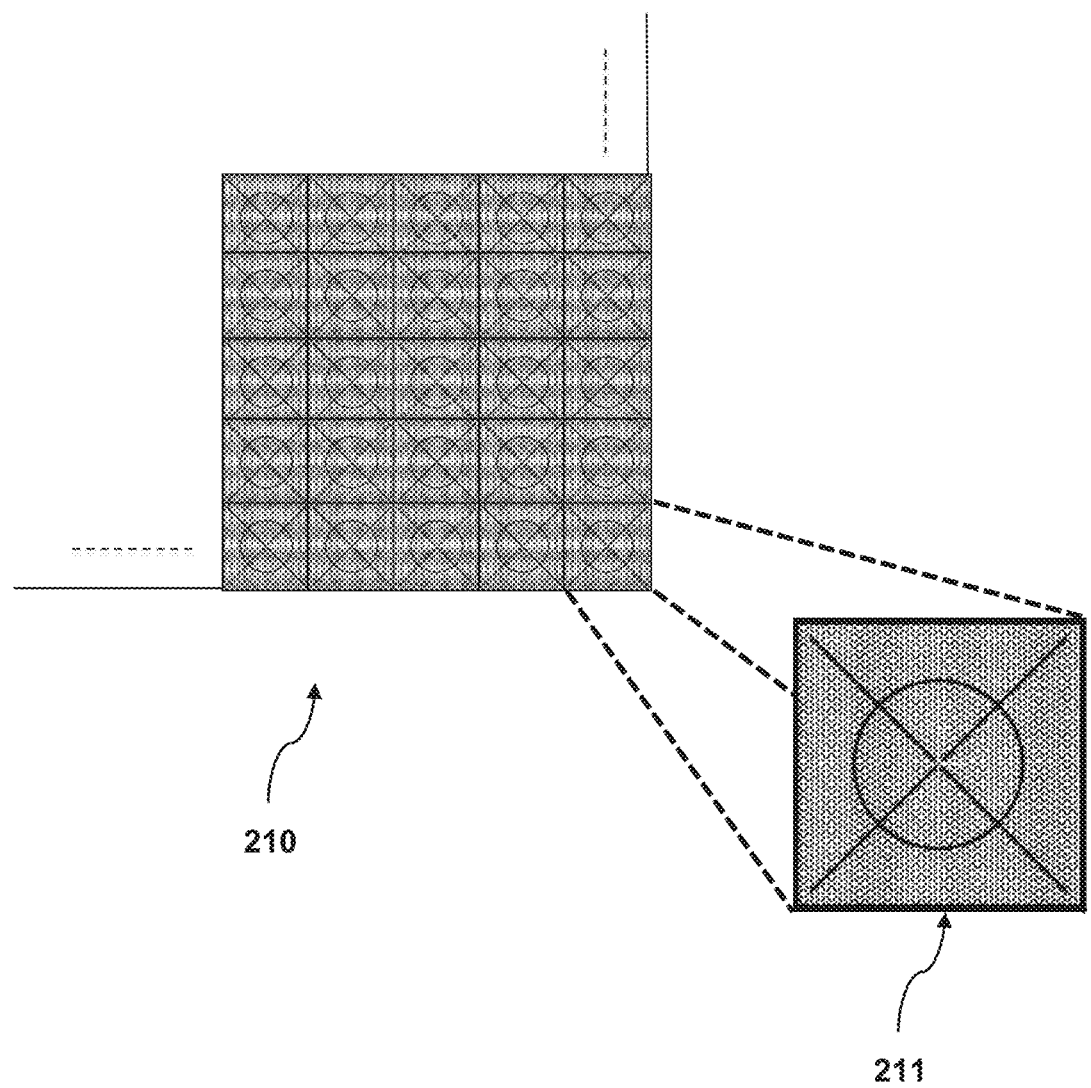
FIG. 10 is a fragmentary view of the slotted electrically conductive structure and showing one feature element in details in accordance with certain embodiments of the present disclosure.

FIG. 10 illustrates a fragmentary view of the slotted electrically conductive structure 200 having a pattern slot 210. In the pattern slot 210, a plurality of feature elements 211 are arranged in rows and columns repeatedly across the patterned slot 210. One of the feature elements 211 is enlarged to show the details.

Figure 11A:
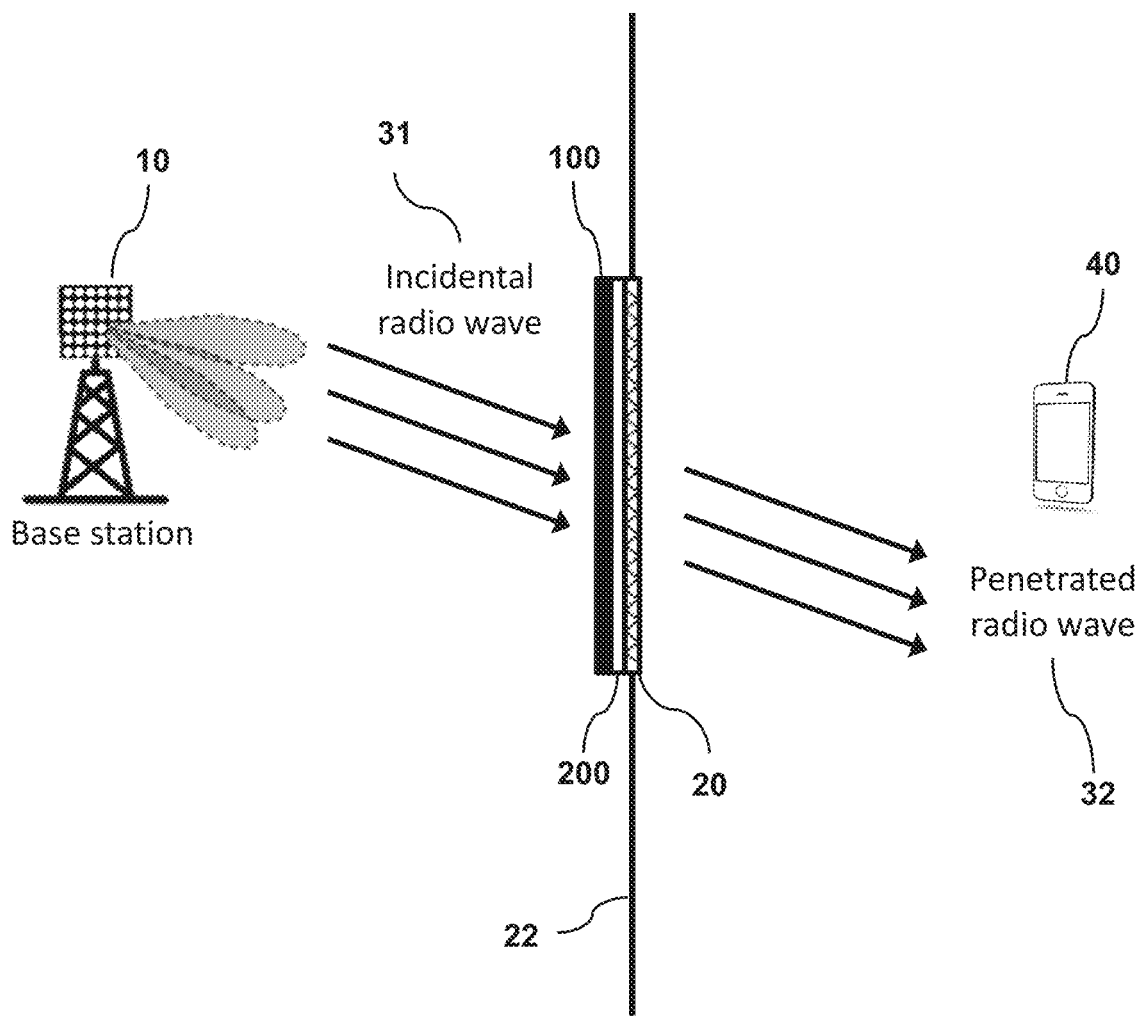
FIG. 11A is a conceptual diagram depicting the propagation of the wireless communication signal through a glass with a slotted electrically conductive structure and a film structure attached on the indoor side in accordance with certain embodiments of the present disclosure.

Multilayer Structure with the Film Structure and the Slotted Electrically Conductive Structure In order to further improve the performance of the signal penetration through the substrate 20, another aspect of the present disclosure provides a multilayer structure having a stack of two structures arranged in any order, as shown in FIG. 11A. The two structures comprise the film structure 100 and the slotted electrically conductive structure 200, attachable to a first surface of the substrate 20. The film structure 100 comprises a plurality of irregularly shaped pits 110 or protrusions 120 for converging the incidental radio wave 31 to a focal point or a focal area 34, while the slotted electrically conductive structure 200 comprises one or more patterned slots 210 having a plurality of feature elements 211 covering an entire area of the patterned slot 210 for reducing thermal energy loss through the substrate 20 and allowing the incidental radio wave 31 to pass through the multilayer structure. In certain embodiments, the multilayer structure further comprises a second film structure 100 attachable to a second surface of the substrate 20. The film structure 100 is configured to converge the incidental radio wave 31 to the focal point or the focal area on the second film structure 100. The second film structure 100 is configured to diverge the incidental radio wave to a plane wave.

Figure 11B:
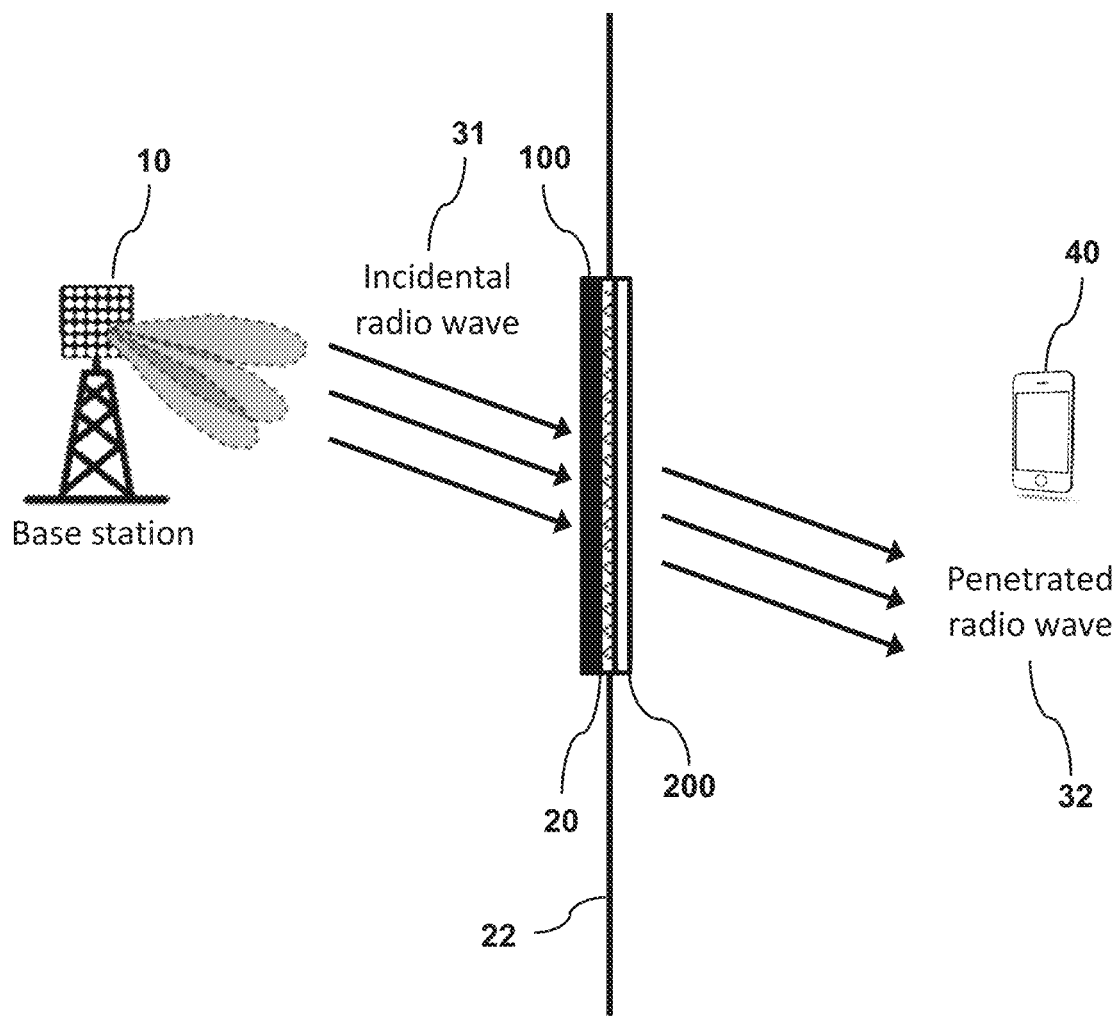
FIG. 11B is a conceptual diagram depicting the propagation of the wireless communication signal through a glass with a slotted electrically conductive structure and a film structure attached on the outdoor side in accordance with certain embodiments of the present disclosure.

In yet another embodiment, the multilayer structure can also be formed by attaching the film structure 100 on one side of the substrate 20, and the slotted electrically conductive structure 200 on another side of the substrate 20, as shown in FIG. 11B.

Figure 12:
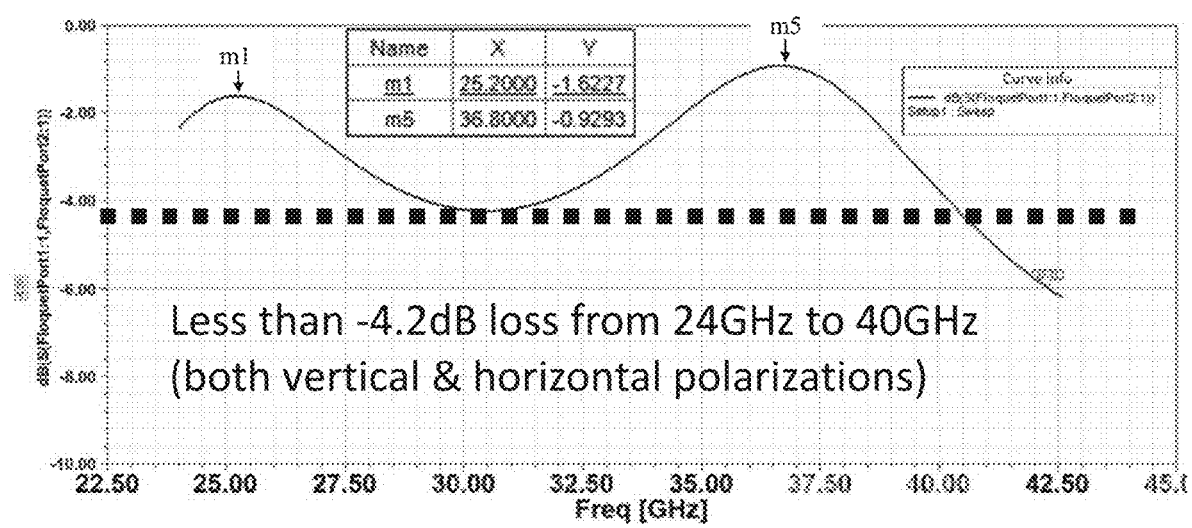
FIG. 12 is a high-frequency structure simulator (HFSS) simulation result for propagating 24 GHz to 42 GHz signals to a glass with a film structure.

The penetration performance of the present disclosure is analyzed using high frequency structure simulator (HFSS) computation algorithm. FIG. 12 shows one HFSS simulation result for propagating 24 GHz to 42 GHz radio waves to a typical glass with a film structure 100 of the present disclosure. For both vertical and horizontal polarizations, the signal loss through the substrate 20 is between −0.8 dB to −4.2 dB, with the peak loss at around 31 GHz. The frequency for peak loss can be adjusted by changing the size and depth of the pits 110 or protrusions 120 on the film structure 100. Therefore, the film structure 100 can be optimized to particular frequency ranges. As the frequency bands are fixed by the network service providers as agreed and licensed from the government, therefore the frequency bands are not changing from time to time. The design of the film structure 100 can be optimized for each particular city or country such that a minimum signal loss can be achieved for the operating frequency. In case the city supports a plurality of frequency bands, the structure of the fourth slotted electrically conductive structure 200D may be used to configure different film structures for different frequency bands.

This illustrates the fundamental structure of the thin film structure in accordance with the present disclosure. It will be apparent that variants of the above-disclosed and other features and functions, or alternatives thereof, may be combined into many other different systems or applications. The present embodiment is, therefore, to be considered in all respects as illustrative and not restrictive. The scope of the disclosure is indicated by the appended claims rather than by the preceding description, and all changes that come within the meaning and range of equivalency of the claims are therefore intended to be embraced therein.

What is claimed is:

1. A multilayer structure having a stack of two structures arranged in any order attachable to a first surface of a substrate having a first dielectric constant and configured to enhance penetration of an incidental radio wave with a wavelength λ through the substrate by allowing a substantial portion of the incidental radio wave to penetrate from a first region having a second dielectric constant to a second region through the substrate, the two structures comprising a slotted electrically conductive structure and a film structure for converging the incidental radio wave to a focal point or a focal area in the second region, wherein:

the slotted electrically conductive structure comprises:
   a metallic base layer of transparent metal or metal oxide;
   an adhesive layer for attaching the metallic base layer to the substrate; and
   one or more patterned slots provided on the metallic base layer, wherein each of the patterned slots comprises a plurality of feature elements covering an entire area of the patterned slot, wherein:
      the metallic base layer not covered by the plurality of feature elements has a reduced thermal energy loss and a problem of signal blockage and reflection; and
      the plurality of feature elements is configured to allow the incidental radio wave to pass through the slotted electrically conductive structure;
the film structure comprises:
   a bottom layer of transparent material; and
   a plurality of irregularly shaped protrusions distributing randomly across the film structure and protruding from the bottom layer;
each of the irregularly shaped protrusions has a height less than 2λ and a width less than 2λ;
the substrate, after attaching the film structure thereon, has a third dielectric constant and is configured to converge the incidental radio wave to the focal point or the focal area in the second region; and
the third dielectric constant has a value closer to the second dielectric constant.

2. The multilayer structure of claim 1, wherein any two adjacent protrusions are separated by a distance in a range between 0.2λ and 2λ.

3. The multilayer structure of claim 1, wherein the bottom layer is a fully transparent material selected from a group consisting transparent plastic, glass, Sapphire ($Al_2O_3$) and Acrylic.

4. The multilayer structure of claim 1, further comprising a second film structure attachable to a second surface of the substrate, wherein:
the film structure is configured to converge the incidental radio wave to the focal point or the focal area on the second film structure; and
the second film structure is configured to diverge the incidental radio wave to a plane wave.

5. The multilayer structure of claim 4, wherein the substrate is a double layer glass.

6. The multilayer structure of claim 1, wherein the incidental radio wave is a wireless radio wave operating with 5G technologies.

7. The multilayer structure of claim 1, wherein each of the plurality of feature elements has a feature length less than nλ/2 and a feature width less than nλ/2, wherein n=0.5, 1, 1.5, . . . etc, such that the incidental radio wave can pass through the slotted electrically conductive structure.

8. The multilayer structure of claim 1, wherein the plurality of feature elements are arranged in rows and columns repeatedly across the patterned slot, and wherein each of the feature elements has a pattern symmetrically arranged in both vertical and horizontal directions.

9. The multilayer structure of claim 1, wherein the plurality of feature elements are formed by a combination of a transparent metallic coating and transparent non-metallic lines.

10. The multilayer structure of claim 1, wherein the plurality of feature elements are formed by a combination of a transparent non-metallic coating and transparent metallic lines.

11. The multilayer structure of claim 1, wherein the one or more patterned slots comprise a first patterned slot having a first feature element and a second patterned slot having a second feature element, and wherein the first patterned slot and the second patterned slot are configured to transmit or receive different frequency ranges of radio waves through the substrate, and the slotted electrically conductive structure allows the incidental radio wave of a wide range of frequencies to penetrate.

12. A multilayer structure having a stack of two structures arranged in any order attachable to a first surface of a substrate having a first dielectric constant and configured to enhance penetration of an incidental radio wave with a wavelength λ through the substrate by allowing a substantial portion of the incidental radio wave to penetrate from a first region having a second dielectric constant to a second region through the substrate, the two structures comprising a slotted electrically conductive structure and a film structure for converging the incidental radio wave to a focal point or a focal area in the second region, wherein:

the slotted electrically conductive structure comprises:
   a metallic base layer of transparent metal or metal oxide;
   an adhesive layer for attaching the metallic base layer to the substrate; and
   one or more patterned slots provided on the metallic base layer, wherein each of the patterned slots comprises a plurality of feature elements covering an entire area of the patterned slot, wherein:
      the metallic base layer not covered by the plurality of feature elements has a reduced thermal energy loss and a problem of signal blockage and reflection; and
      the plurality of feature elements is configured to allow the incidental radio wave to pass through the slotted electrically conductive structure;
the film structure comprises:
   a bottom layer of transparent material; and
   a plurality of irregularly shaped pits distributing randomly across the film structure and engraved from the bottom layer;
each of the irregularly shaped pits has a depth less than 2λ and a width less than 2λ;
the substrate, after attaching the film structure thereon, has a third dielectric constant and is configured to converge the incidental radio wave to the focal point or the focal area in the second region; and
the third dielectric constant has a value closer to the second dielectric constant.

13. The multilayer structure of claim 12, wherein any two adjacent pits are separated by a distance in a range between 0.2λ and 2λ.

14. The multilayer structure of claim 12, wherein the bottom layer is a fully transparent material selected from a group consisting transparent plastic, glass, Sapphire ($Al_2O_3$) and Acrylic.

15. The multilayer structure of claim 12, further comprising a second film structure attachable to a second surface of the substrate, wherein;

the film structure is configured to converge the incidental radio wave to the focal point or the focal area on the second film structure; and the second film structure s configured to diverge the incidental radio wave to a plane wave.

16. The multilayer structure of claim 15, wherein the substrate is a double layer glass.

17. The multilayer structure of claim 12, wherein the incidental radio wave is a wireless radio wave operating with 5G technologies.

18. The multilayer structure of claim 12, wherein each of the plurality of feature elements has a feature length less than $n\lambda/2$ and a feature width less than $n\lambda/2$, wherein n=0.5, 1, 1.5, . . . etc, such that the incidental radio wave can pass through the slotted electrically conductive structure.

19. The multilayer structure of claim 12, wherein the plurality of feature elements are arranged in rows and columns repeatedly across the patterned slot, and wherein each of the feature elements has a pattern symmetrically arranged in both vertical and horizontal directions.

20. The multilayer structure of claim 12, wherein the plurality of feature elements are formed by a combination of a transparent metallic coating and transparent non-metallic lines.

21. The multilayer structure of claim 12, wherein the plurality of feature elements are formed by a combination of a transparent non-metallic coating and transparent metallic lines.

22. The multilayer structure of claim 12, wherein the one or more patterned slots comprise a first patterned slot having a first feature element and a second patterned slot having a second feature element, and wherein the first patterned slot and the second patterned slot are configured to transmit or receive different frequency ranges of radio waves through the substrate, and the slotted electrically conductive structure allows the incidental radio wave of a wide range of frequencies to penetrate.

* * * * *